Oct. 29, 1929.                U. NISTRI                1,733,234
                        FILM PHOTOGRAPHIC CAMERA
                        Filed June 1, 1926        2 Sheets-Sheet 1
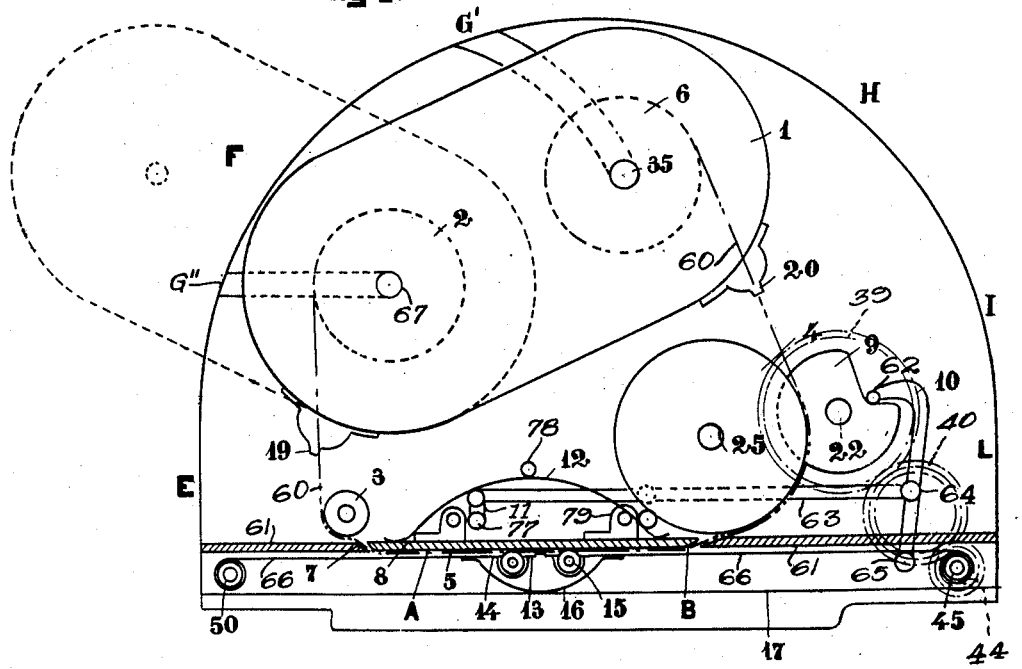
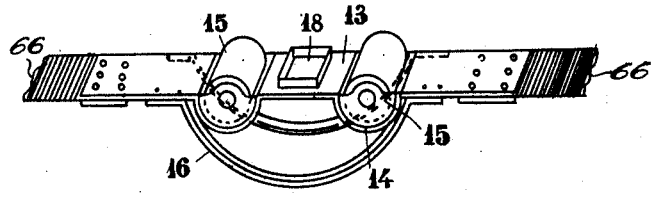
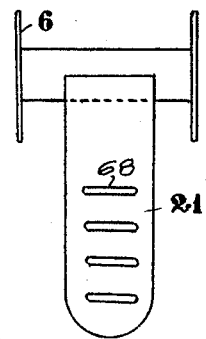
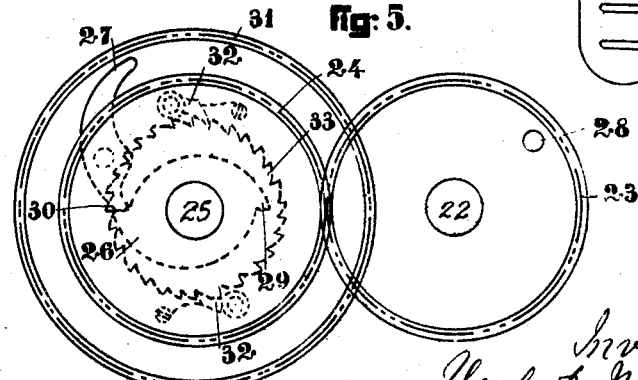

Oct. 29, 1929.  U. NISTRI  1,733,234
FILM PHOTOGRAPHIC CAMERA
Filed June 1, 1926   2 Sheets-Sheet 2
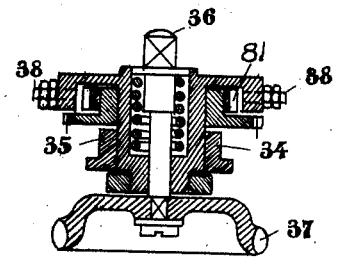
Fig. 6.
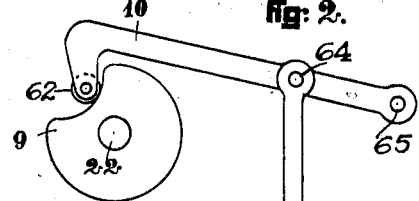
Fig. 2.
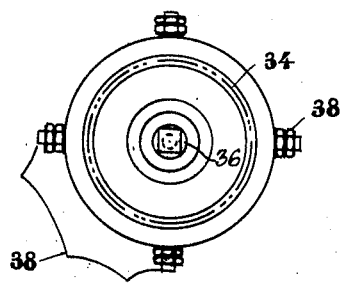
Fig. 7.
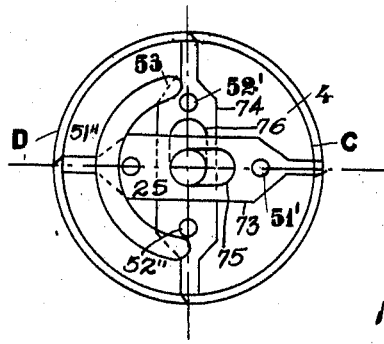
Fig. 9.
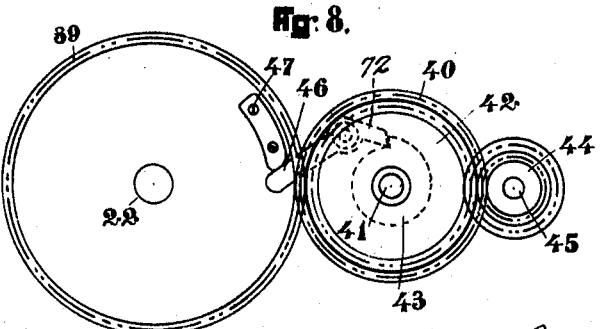
Fig. 8.
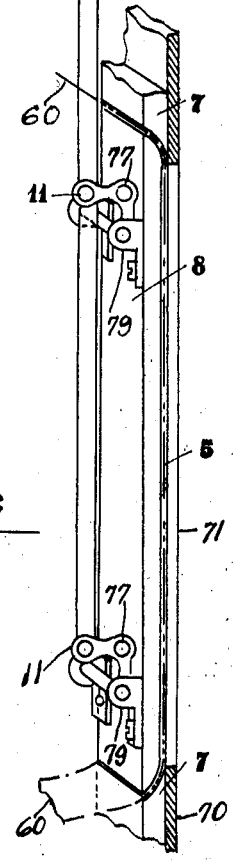
Inventor:
Umberto Nistri
By [signature]
Atty.

Patented Oct. 29, 1929

1,733,234

UNITED STATES PATENT OFFICE

UMBERTO NISTRI, OF ROME, ITALY

FILM PHOTOGRAPHIC CAMERA

Application filed June 1, 1926, Serial No. 113,079, and in Italy June 5, 1925.

My invention relates to improvements in photographic cameras and more particularly to that class of cameras with film spools intended to make photographs of greater size than those of the usual motion picture apparatus.

Photographic cameras of said class have been already built or proposed, wherein in order to prevent buckling of the film during the exposure, which is practically unavoidable notwithstanding the most careful tensioning, a transparent plate has been provided against which the film is pressed during the exposure by means of a pad or pressing plate applied at its back. The presence of the transparent plate inserted before the film being not desirable, one of the objects of the invention is a device to allow keeping perfectly flat the portion of the film to be exposed in the focal plane of the machine at the moment of the exposure without the use of the above mentioned transparent plate, and includes also the means provided for transmitting the movement to the various devices contained in the camera, as well as to the shutter.

The result aimed at is obtained by pressing the portion of the film to be exposed, and lying in the focal plane, against the edges of a window serving as support while two rollers are moved across the window and insure the perfect stretching of the film during the exposure.

In the annexed drawing diagrammatically showing by way of illustration an embodiment of the invention, Fig. 1 is a section of the box containing the film shown applied to a photographic apparatus the objective of which is directed downwards.

Fig. 2 is on an enlarged scale a perspective view of the means for pressing the film against the window of the frame.

Fig. 3 is a perspective view of the curtain shutter with the rollers for stretching the film.

Fig. 4 shows the receiving spool provided with an attaching tongue for the film.

Fig. 5 shows the connection between the main shaft and a roller which produces the intermittent motion of the film.

Figs. 6 and 7 are respectively a diametrical section and a top view of an adjustable friction clutch for compensating the variations due to the winding of the film upon the reel.

Fig. 8 shows a device for controlling the action of the shutter.

Fig. 9 shows a device for carrying the film and marking the position of each picture.

As will be seen from Fig. 1, the film 60 is wound upon reels 2 and 6 contained in a box 1 placed at the rear of the camera. The film as it unwinds from the reel 2 passes under a roller 3, resting upon the focal plane A 5 B, which coincides with the outer face of the wall 61, and passing under the roller 4 returns to the interior of the box 1 where it is wound upon the reel 6.

That portion of the film to be exposed rests upon the focal plane A 5 B and is comprised within the edges of a window, the opening of which is perfectly equal to a corresponding opening 71 of the camera provided in the fixed frame 70 forming the back wall of the lens carrying box and a movable upper plate 8 which exactly covers said window and is more clearly shown in Fig. 2. The lens carrying box is not shown in the drawing.

At the moment of the exposure the rotation of a cam 9 (Figures 1 and 2) by means of the lever 10, one end of which carries a roller 62 riding on the edge of the cam, the links 11 pivoted at 77, and articulated with one of their ends to the lugs 79 of the plate 8, the connecting rod 63 articulated at 64 to the lever 10, which is pivoted at 65 and the springs 12 resting against a pivot 78, cause the descent under the action of spring 12 of the movable plate 8 which thereby tightly presses the film 60 against the window 7 of the wall 61.

At the same time, the curtain shutter 66 supported by the armature 14 (Figs. 1 and 3) registers with the said window, and two rollers 15 carried by the said armature 14 move across the window 7 and against the plate 8 thereby stretching the film; the curtain is held against the window by the springs 16 sliding upon a smooth plane 17.

The curtain of the shutter sliding swiftly allows the exposure of the film through the opening 18 shown in Fig. 3 the film being stretched upon the plate 8 by means of the rollers 15.

After the exposure of the film the roller 62 reaches the circular portion of the edge of the cam 9 and thereby compels the lever 10 to swing in such a manner as to cause the links 11 to lift the plate 8 from the window, overcoming the resistance of the spring 12, and to keep it lifted while the film is carried forward.

As has been mentioned above, the box 1 carrying the film contains the feeding reel 2 as well as the collecting reel 6, and the casing H within which the box 1 is contained is provided with bearings for the pivots 67, 35 of the reels 2 and 6 on which pivots the box 1 is mounted, and in order to allow the substitution of the box 10, when the whole length of the film has been exposed, the casing H is provided with grooves G', G'' along which can slide the pivots 35, 67 of the two reels. The film comes out from the box through a slit 19 near the reel 2 and returns to the box after exposure through another slit 20 near reel 6. For this purpose the collecting reel 6 is provided with a tongue 21 (Fig. 4) of thin sheet metal showing several cross cuts 68. The said tongue projects cut from the box 1 the said cuts serving for fastening the film to the reel 6, which in revolving draws the film within the box.

The movements of the film and of the shutter are controlled in the manner now to be explained. To the shaft 22, the main shaft of the apparatus rotated by any convenient means and transmission not shown in the drawing and which is kept continually rotating while the apparatus is working, is keyed the cam 9 which periodically causes the lowering of the movable plate 8 upon the film and the lifting of the same plate after the exposure. Upon the same main shaft 22 is keyed also a toothed wheel 23 (Fig. 5) meshing with a wheel 24 loosely mounted on the shaft 25 of the roller 4. For the sake of clearness, the wheels 23 and 24 which are shown in Fig. 5 have been omitted from Fig. 1. The wheel 24 carries a pawl 27, which when revolving together with the wheel moves a cam 26 having two diametrically opposite teeth 29 and 30 the said cam being fastened to the roller 4 keyed upon the shaft 25. The wheel 23 has a projecting pin 28 designed to lift the pawl 27 thereby disengaging same from the cam, as soon as the wheel 24 has made a rotation of 180° counted from the initial position. When the pawl is disengaged, it will ride over the cam which will stop until the pawl meets the other tooth and thereby maintaining arrested also the roller 4, the movement of said pieces beginning again when, after another rotation of 180° of the wheel 24, the pawl 27 falls down again upon the cam at the tooth diametrically opposite. The device now to be described constitutes an automatically detachable connection between the wheel 23 and the roller 4, by means of which is obtained an intermittent rotation of the roller 4, the periodical stopping of the roller 4 causing in its turn the stopping of the film at each step of the operation.

In order to secure a synchronous movement of the roller 4 and of the collecting reel 6 there is provided, as shown in Fig. 5, a device consisting of a wheel 31 loosely mounted upon the shaft 25 of the roller 4 and provided with two diametrically opposite pawls 32, which engage the teeth of a ratchet wheel 33 integral with cam 26 and therefore moving together with the roller 4; it follows that on the cam 26 rotating together with the roller 4 the wheel 31 is also put in motion.

The wheel 31 meshes in its turn with the wheel 34, Figs. 6 and 7, which is loose on the shaft 35 of the reel 6. Said shaft can be connected with the roller by withdrawing a knob 37 in such a manner as to cause the square bolt 36 to engage a corresponding recess provided in the bottom of the reel 6. The movement of the wheel 34 is transmitted to the reel 6 by means of a friction clutch controlled by means of screws 38 acting on brake shoes 81 in such a manner as to carry the reel, allowing however the necessary slip to compensate for the variation in the winding of the film upon the reel. It should be noted that when, in loading the camera, the reel 6 is rotated by hand, by means of the knob 37, the roller 4 remains at rest because the wheel 31 rotates in the contrary direction of that which permits it engaging and carrying along the ratchet wheel 33.

The action of the shutter is controlled by means of a device comprising a wheel 39, Fig. 8, mounted on the main shaft 22 and meshing with a wheel 40 loosely mounted upon a shaft 41 whereon is loosely mounted also another wheel 42, which carries a cam 43. The wheel 42 meshes with the wheel 44 which is used for winding up the roller with the curtain of the shutter upon the shaft 45.

The rotation of the wheel 39 is transmitted to the wheel 40 and causes the lifting of the pawl 46 carried by the wheel 40, when its tail meets the projection 47 which moves together with the wheel 39. The pawl 46, when its end 72 is lowered, will move the cam 43 upon which it rests and therefore causes the wheel 42 to rotate, which transmits the movement to the wheel of the curtain.

Each time the end 72 of the pawl 46 is raised, the curtain is released and snaps under the action of a spring coiled upon the pivot 50, Fig. 1, the curtain being released soon afterwards, that is when the pawl 46 meets again the cam while rotating.

The roller 4 is provided with a device for carrying the film and marking the position of each picture. Said device, Fig. 9, consists of two double punches 73, 74 fastened to the end faces of the roller and movable radially, for which purpose they are provided with openings 75, 76 having an elongated shape and through which passes the shaft 25 of the roller 4; the said punches are pushed against the film by means of the pins 51, 52 and the cam 53 in such a manner that their projecting ends will perforate the film. One of said punches engages the film during its whole passage upon the half periphery C of roller 4 while they are inverted during the passage upon the half periphery D under the action of the cam and of the opposite pivot.

To complete the camera there is provided the cover H of semi cylindrical shape which protects the whole surface against the action of the light during the operation.

I claim:

1. In combination with a photographic camera, a supporting plate for the film to be exposed, an operating shaft, means controlled by said shaft for periodically lowering and raising said supporting plate, said plate when lowered pressing the film against the edge of the exposure opening, a curtain shutter adapted to slide in front of said opening, and rollers carried by the armature of said shutter for stretching the film when in front of said opening.

2. The combination as specified in claim 1, in which the means for periodically lowering and raising the supporting plate comprise a cam mounted on said operating shaft, a lever controlled by said cam, and links connected to said lever and said plate, the arrangement being such that the lowering of said plate times with the closing and the raising of said plate times with the opening of said shutter.

3. The combination as specified in claim 1, including a collecting reel, guiding rollers for the film, one of said rollers adapted to carry the exposed film to said collecting reel, a clutch interposed between said operating shaft and said carrying roller, a cam on said shaft, and means controlled by said cam for disengaging said clutch and arresting said roller during the exposure of the film and reengaging said clutch after the exposure.

4. The combination as specified in claim 1, including a feeding and a collecting reel for the film, guiding and carrying rollers, connecting means between the carrying roller and said collecting reel, said connecting means comprising an adjustable friction clutch adapted to compensate for the variations due to the winding of the film upon said reel.

5. The combination as specified in claim 1, including means for insuring the synchronous movement of said supporting plate and said shutter, and means actuated by said operating shaft for controlling said first named means, and comprising gears including a ratchet wheel, driven by said shaft, a pawl, and a cam acting to engage and disengage said pawl, so as to cause the lowering of said plate, its temporary arrest and the raising of the plate to time respectively with the closing, the opening and the temporary inoperation of said shutter.

In testimony whereof I have affixed my signature at Rome this 18th day of May, 1926.

UMBERTO NISTRI.